United States Patent
Neul et al.

(10) Patent No.: US 9,003,881 B2
(45) Date of Patent: Apr. 14, 2015

(54) MICROMECHANICAL SYSTEM

(75) Inventors: Reinhard Neul, Stuttgart (DE); Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 13/197,100

(22) Filed: Aug. 3, 2011

(65) Prior Publication Data
US 2012/0031183 A1 Feb. 9, 2012

(30) Foreign Application Priority Data
Aug. 4, 2010 (DE) .......................... 10 2010 038 919

(51) Int. Cl.
*G01C 19/56* (2012.01)
*G01C 19/5755* (2012.01)

(52) U.S. Cl.
CPC .................................. *G01C 19/5755* (2013.01)

(58) Field of Classification Search
CPC ................................................... G01C 19/5747
USPC ......................................... 73/504.02, 504.12
See application file for complete search history.

(56) References Cited

U.S. PATENT DOCUMENTS

| 5,728,936 | A | * | 3/1998 | Lutz | 73/504.14 |
| 2010/0186506 | A1 | * | 7/2010 | Robert | 73/504.12 |

* cited by examiner

*Primary Examiner* — John Chapman, Jr.
(74) *Attorney, Agent, or Firm* — Kenyon & Kenyon LLP

(57) ABSTRACT

A yaw-rate sensor for determining a Coriolis force includes a semiconductor substrate, a mass body mounted so it is movable over the semiconductor substrate, a drive unit for setting the mass body into an oscillating movement, and a detection unit for determining a deflection of the mass body which is caused by the Coriolis force. The detection unit includes a piezoresistive element, whose electrical resistance is a function of the deformation of the piezoresistive element.

8 Claims, 3 Drawing Sheets

MICROMECHANICAL SYSTEM

FIELD OF THE INVENTION

The present invention relates to a yaw-rate sensor. In particular, the present invention relates to a micromechanical yaw-rate sensor.

BACKGROUND INFORMATION

Micromechanical yaw-rate sensors may be used in order to determine forces and accelerations, for example, in a yaw-rate sensor. A mass body, which is movable in relation to a substrate along two axes perpendicular to one another, is provided in one variant. The mass body is set into an oscillating movement in one direction using a drive unit. If the yaw-rate sensor is rotated around an axis which is perpendicular to the plane in which the mass body is movable, the mass body is deflected in this plane in a direction which is perpendicular to the driven direction. This deflection is caused by the Coriolis force and may be recorded using a suitable detection unit, in order to provide a signal which is a function of a yaw rate of the yaw-rate sensor.

Various configurations are known for both the drive unit and the detection unit. The present invention is based on the object of specifying a yaw-rate sensor which has a reduced space requirement.

SUMMARY OF THE INVENTION

According to the present invention, a yaw-rate sensor for determining a Coriolis force includes a semiconductor substrate, a mass body mounted so it is movable over the semiconductor substrate, a drive unit for setting the mass body into an oscillating movement, and a detection unit for determining a deflection of the mass body caused by the Coriolis force. The detection unit includes a piezoresistive element, whose electrical resistance is a function of the deformation of the piezoresistive element.

In comparison, for example, to a capacitive determination unit for the position of the mass body, installation space may thus be saved, so that the yaw-rate sensor may be reduced in size overall. Production outlay may thus be reduced and the resulting yaw-rate sensor may be usable more universally due to its reduced external dimensions.

Preferably, the mass body includes two mass elements, which are set into movement in opposite directions by the drive unit, and the piezoresistive element is situated between the mass elements and is operationally linked to the mass elements in such a way that the deflections of the mass elements caused by the Coriolis force act on the piezoresistive element in opposite directions. This allows a differential measurement via which interfering influences, which influence the movements of both mass elements in the same way, may be able to be compensated against one another.

The piezoresistive element may be operationally linked to the semiconductor substrate and the yaw-rate sensor may include a lever element which is mounted in an anchor point so it is rotatable on a semiconductor substrate and which is coupled to the mass body and the piezoresistive element so that a force or movement introduced by the mass body into the lever element is transmitted by the lever element with a conversion factor to the piezoresistive element. By selecting a corresponding conversion factor, an adaptation may be performed between the structural geometry of the moving parts of the yaw-rate sensor and a signal provided by the piezoelectric element, which is a function of a force or a deformation of the piezoelectric element.

A lever element may be associated with each mass element, the piezoresistive element being situated between the lever elements. A differential measurement may thus be simplified.

An isolation element for electrical isolation may be situated on at least one of the lever elements, so that a part of the lever element and the piezoelectric element are electrically isolated from the semiconductor substrate. An interaction between the current path, via which the signal provided by the piezoelectric element is tapped, and the drive unit or other moving elements of the yaw-rate sensor may thus be prevented, whereby the measurement precision may be increased.

A lever element may be associated with each mass element, the lever elements being coupled to one another using a compensating spring and the piezoresistive element being situated between one of the lever elements and a suspension point on the semiconductor substrate. This represents a further possibility for decoupling the measuring signal from elements of the yaw-rate sensor which may interact with the measuring signal.

A second piezoresistive element, which is situated between a second lever element and a second anchor point, may be provided, an electrical subtraction unit being provided in order to compare the signals provided by the piezoresistive elements. This specific embodiment suggests itself to simulate a mechanical subtraction, which is used to absorb errors which affect two mass elements inversely.

The drive unit may set the mass body into movement mechanically, electrostatically, magnetically, optically, piezoelectrically, chemically, and/or thermally. Usability of the piezoresistive element is independent of the drive principle of the mass body, so that the yaw-rate sensor is implementable using any arbitrary known drive unit.

The drive unit and the detection unit may be configured in such a way that a drive voltage of the drive unit is isolated in time and/or by a differing frequency modulation from a measuring current of the detection unit. Mutual influences between the drive voltage and the measuring current may thus be minimized and the determination may be improved. A square-wave, triangular, or sinusoidal signal may be used for the modulation, for example.

DETAILED DESCRIPTION

Figure 1:
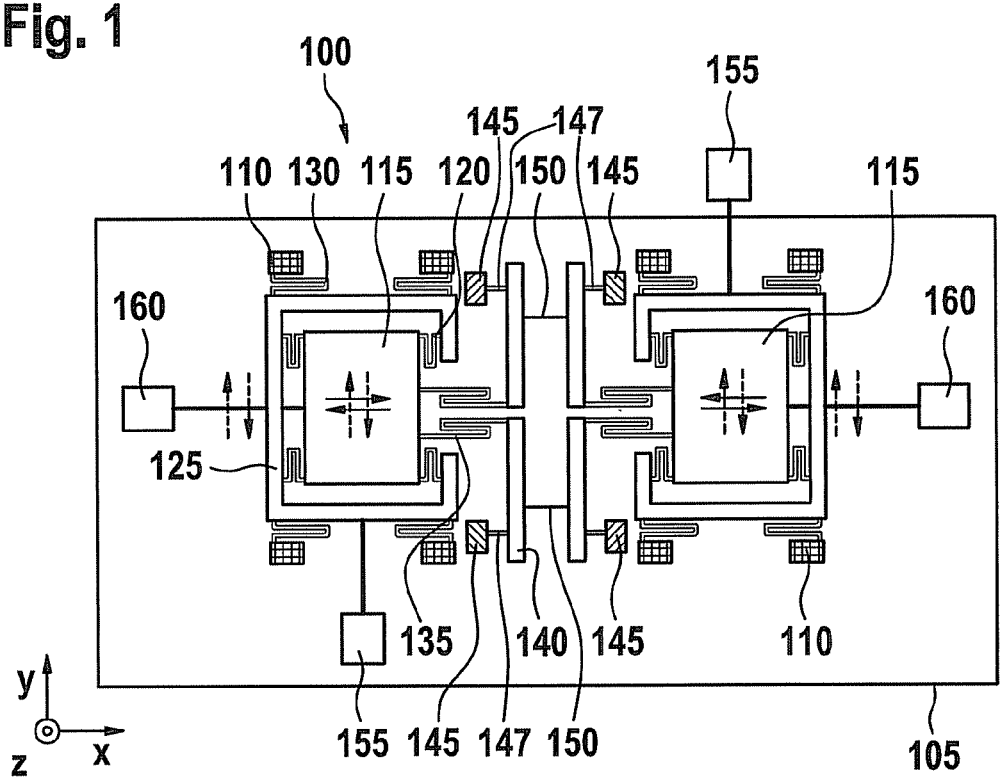
FIG. 1 shows a micromechanical yaw-rate sensor.

FIG. 1 shows a micromechanical yaw-rate sensor 100. Yaw-rate sensor 100 is situated on a semiconductor substrate 105. An x-y-z coordinate system shown on the lower left is used for reference. The object of yaw-rate sensor 100 is to provide an electrical signal, which is a function of a rotation of yaw-rate sensor 100 around the z axis.

Yaw-rate sensor 100 includes a left section and a right section, which are constructed in a mirror image to one another with respect to a perpendicular central axis, the left section being described hereafter. A rectangular mass body 115 is fastened using coupling springs 120 on a frame 125. Frame 125 is also rectangular and is closed on three sides. A fourth side points in the direction of the central axis and is interrupted in its center. Coupling springs 120 lead from the corners of mass body 115 in the x direction to fastening points on frame 125. Each of coupling springs 120 is curved essentially in a U-shape in the y direction, the bends pointing toward one another in the y direction, so that coupling springs 120 are elastically deformable in the event of a movement of mass body 115 with respect to frame 125 in the x direction and are rigid in the event of a movement of mass body 115 in the y direction. Therefore, mass body 115 is only movable in the x direction, but not in the y direction, in relation to frame 125.

Oscillation springs 130 are attached at the corners of frame 125, the oscillation springs leading in the y direction to anchor points 110, which are mechanically connected to semiconductor substrate 105, but are electrically isolated from semiconductor substrate 105. Oscillation springs 130 are constructed corresponding to coupling springs 120, the U-shaped bends of oscillation springs 130 running in the x direction, however, so that frame 125 is movable in the y direction and is immovable in the x direction in relation to substrate 105. As a whole, mass body 115 is thus suspended so it is movable in the x-y plane.

Analysis springs 135 are fastened on the side of mass body 115 which faces toward the axis of symmetry. Analysis springs 135 extend in the x direction through the interruption of the fourth side of frame 125 up to a pair of levers 140 running in the y direction. Levers 140 are bar shaped and lie on an axis in the y direction. Analysis springs 135 are bent in S-shapes or Z-shapes and are therefore rigid in the x direction and elastic in the y direction. Fastening points of analysis springs 135 on levers 140 are located at the ends of levers 140 which face toward one another in the y direction, i.e., the lower end of upper lever 140 and the upper end of lower lever 140.

Upper lever 140 is mounted in the area of its upper end using a bending web 147, which runs in the x direction, on an anchor point 145, which is attached in an electrically isolated manner on substrate 105. Bending web 147 is dimensioned narrower than lever 140, so that lever 140 is deflectable around a pivot point in the area of bending web 147. Lower lever 140 is constructed correspondingly to upper lever 140, lower lever 140 being mounted in the area of its lower end using a bending web 147 on an anchor point 145. Upper and lower bending webs 147 run parallel to one another, in each case to the left from levers 140. Bending webs 147 may also be omitted depending on the selected specific embodiment, and levers 140 may be connected directly to anchor points 145.

A piezoresistive element 150, which extends to the right in the y direction, is fastened on lower lever 140 in an area between bending web 147 and the lower end. A piezoresistive element 150 corresponding thereto, which also extends to the right in the y direction and runs parallel to upper piezoresistive element 150, is located on lower lever 140. Forces and movements which are introduced into lever 140 by analysis spring 135 are converted into forces or movements which act on piezoresistive element 150 in a known way according to the lever rule and are based on a conversion factor, which corresponds to a ratio of distances of the particular fastening points of analysis spring 135 and piezoresistive element 150 from the pivot point of lever 140.

The right section of yaw-rate sensor 100, which forms a mirror image in relation to the central axis, is located to the right of piezoresistive elements 150.

The right ends of piezoresistive elements 150 are fastened to levers 140 of the right section. Piezoresistive elements 150 deliver a voltage signal which is a function of the force acting in the x direction thereon. Through a corresponding selection of the positions of piezoresistive elements 150 in the y direction on levers 140, the relationship of the voltage signal to the deflection or the deflection force of analysis springs 135, and therefore of frame 125, in the x direction may be set.

Piezoresistive elements 150 may be selected from manifold known constructions. For example, a solid material may be used, such as a bar made of silicon, silicon carbide, or a polymer. Nanowires or carbon nanotubes may also be used. Furthermore, a resistance change of material on a surface of piezoresistive element 150 may be induced, for example, by a metal thin film applied to a bar or by doping which diffuses into the bar. In still a further specific embodiment, piezoresistive element 150 may be applied to an isolating bar, for example, made of silicon dioxide, as a strain gauge.

Levers 140 are one-sided levers which have a step-down ratio, which is a function of a ratio of the lengths between the introduction and delivery points of forces and anchor point 145. This ratio is arbitrarily settable by displacing the piezoresistive elements toward or away from one another. If piezoresistive element 150 is located at half of the length between an anchor point 145 and an analysis spring 135, the ratio is 1:2. Two-sided levers 140 may also be used in further specific embodiments.

Symbolically shown drive units 155 are configured for the purpose of moving frame 125 in the y direction. Drive units 155 may be implemented in manifold known ways. In one specific embodiment, drive unit 155 is implemented as electrostatic, for example, using plate structures or fingers or comb structures ("interdigital fingers"). By applying a voltage between opposing or interlocking fingers or plates, an attractive force acts between these elements, which causes a deflection of frame 125. Alternatively, drive unit 155 may also act magnetically and use the movement force based on the Lorentz force to deflect frame 125, in that areas which have current flowing through them perpendicularly to a magnetic field exert a force on frame 125. In further specific embodiments, drive unit 155 may cause the force piezoelectrically or thermally.

Drive units 155 set frames 125 into a sinusoidal oscillation in the y direction, the phases of the movements of both frames 125 being phase-shifted with respect to one another by 180°. Mass bodies 115 are also set into a sinusoidal oscillation in the y direction by the fastening using coupling springs 120. This deflection is symbolized by dashed arrows in the y direction. Because of Coriolis forces, in the case of a rotation of yaw-rate sensor 100 around the z axis, each mass body 115 is deflected in the x direction. This deflection is symbolized by solid lines in the x direction. The deflections of mass bodies 115 in the x direction are phase-coupled to the movements of mass bodies 115 in the y direction, which are caused by drive units 155. Deflection directions of both mass bodies 115 are antiparallel, i.e., toward or away from one another, depending on the direction of the rotation around the z axis.

The detection oscillation of mass body 115 in the x direction may be used for position feedback control ("closed loop operation") via a symbolically shown control unit 160, e.g., using electrostatic forces. The detection movement in the x direction is thus advantageously reduced and the characteristic curve of yaw-rate sensor 100 is thus linearized, i.e., the mechanical nonlinearities of yaw-rate sensor 100 are suppressed. The position control may alternatively be performed with respect to semiconductor substrate 105 or frame 125.

Mass body 115 represents an oscillating system mounted at multiple points, the oscillation capability in the x direction (detection mode) and in the y direction (drive mode) typically not corresponding to one another because of variations during manufacturing of yaw-rate sensor 100. To compensate for the natural frequencies, one of them is typically influenced so that the frequencies coincide. This is preferably brought about by a force in an electrostatic field, for which purpose corresponding electrodes may be designed on frame 125 and on mass body 115. In one specific embodiment, the modes may be influenced by control unit 160. In another specific embodiment, yaw-rate sensor 100 is accordingly calibrated during the manufacturing, for example, by laser trimming. Through the influencing, the detection oscillation may be made to have a higher-order resonance in the x direction and therefore the signal-to-noise ratio may be improved. This is referred to as full resonance tuning.

Figure 2:
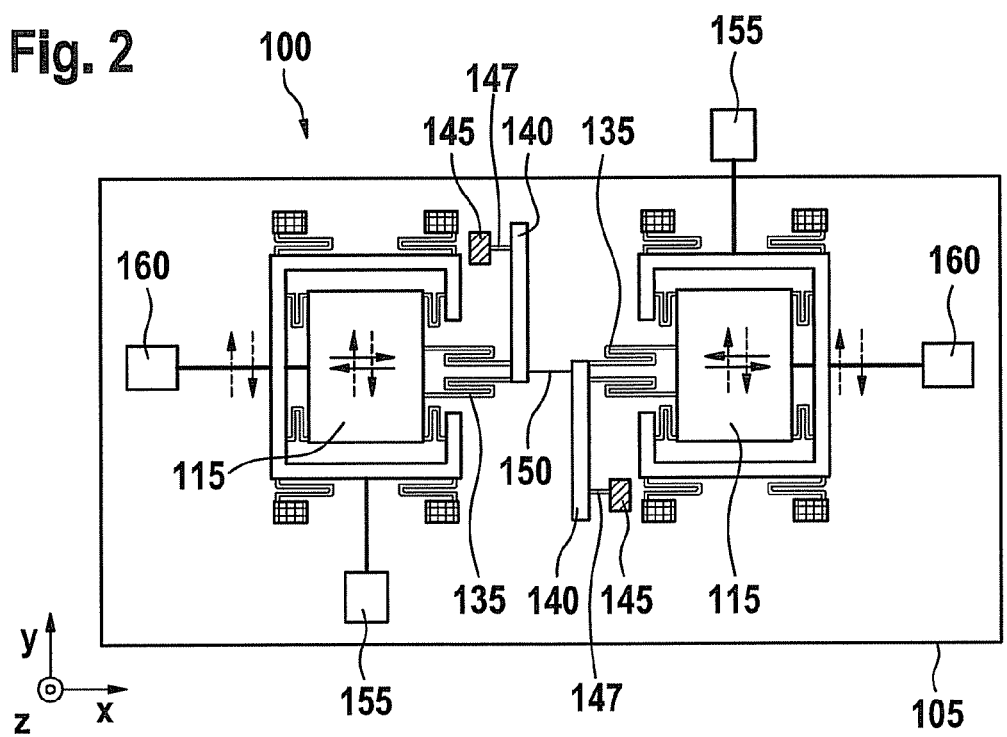
FIG. 2 shows the yaw-rate sensor according to FIG. 1 having a single piezoresistive element.

FIG. 2 shows yaw-rate sensor 100 from FIG. 1 having a single piezoresistive element 150. The illustration corresponds to that from FIG. 1 with the difference that only two levers 140 are provided, between which only one piezoelectric element 150 is situated. Piezoelectric element 150 is connected at each of its ends to one free end of one of levers 140. Free levers 140 are situated essentially parallel to one another. Each of levers 140 is coupled via a compensation spring 135 to one of mass bodies 115. Piezoelectric element 150 is situated parallel to a central axis.

Drive unit 155 in FIGS. 1 and 2 may be activated using an approximately sinusoidal or square-wave alternating drive voltage. In general, the drive voltage interferes with the measuring procedure using piezoelectric element or elements 150. In order to achieve signal isolation of drive and detection, various procedures are possible.

In a first variant, a time multiplexing method may be used. For this purpose, a measuring pulse may be fed into piezoresistive element 150 in the half phases in which no drive voltage is applied to drive unit 155, and the forces acting on piezoresistive element 150 may be measured. In a second variant, the measuring current may be modulated by piezoresistive element 150 using a different frequency than the drive frequency, so that the two signals are separable from one another by frequency filters. In a third variant, drive units 155 may be electrically isolated from remaining yaw-rate sensor 100. For this purpose, isolation trenches may be introduced into semiconductor substrate 105, which may be filled using an isolating material, for example, an oxide.

Figure 3:
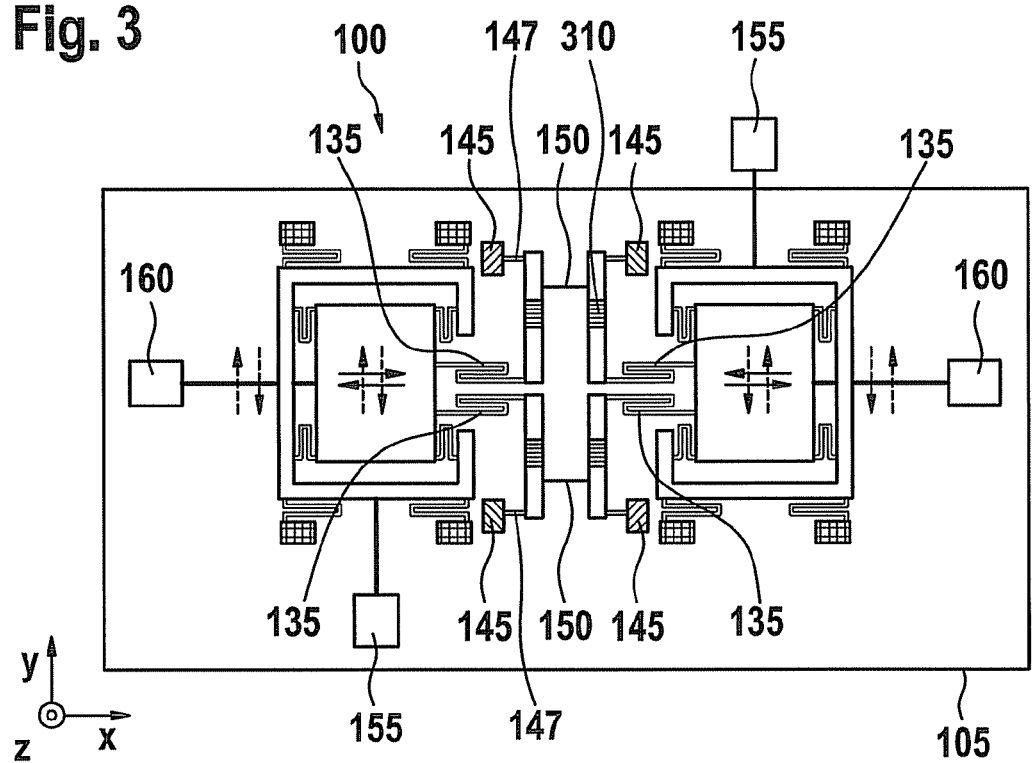
FIG. 3 shows the yaw-rate sensor according to FIG. 1 having electrical isolation.

A third variant is shown in FIG. 3. FIG. 3 shows yaw-rate sensor 100 according to FIG. 1, each of levers 140 being electrically interrupted by an isolating element 310 but simultaneously being mechanically connected, so that a current path runs through each of piezoresistive elements 150 between associated anchor points 145, isolated from remaining yaw-rate sensor 100. Isolating element 310 is preferably implemented as an isolation trench in lever 140. An electrical connection to an analysis circuit is performed via anchor points 145, which are electrically isolated from semiconductor substrate 105.

Figure 4:
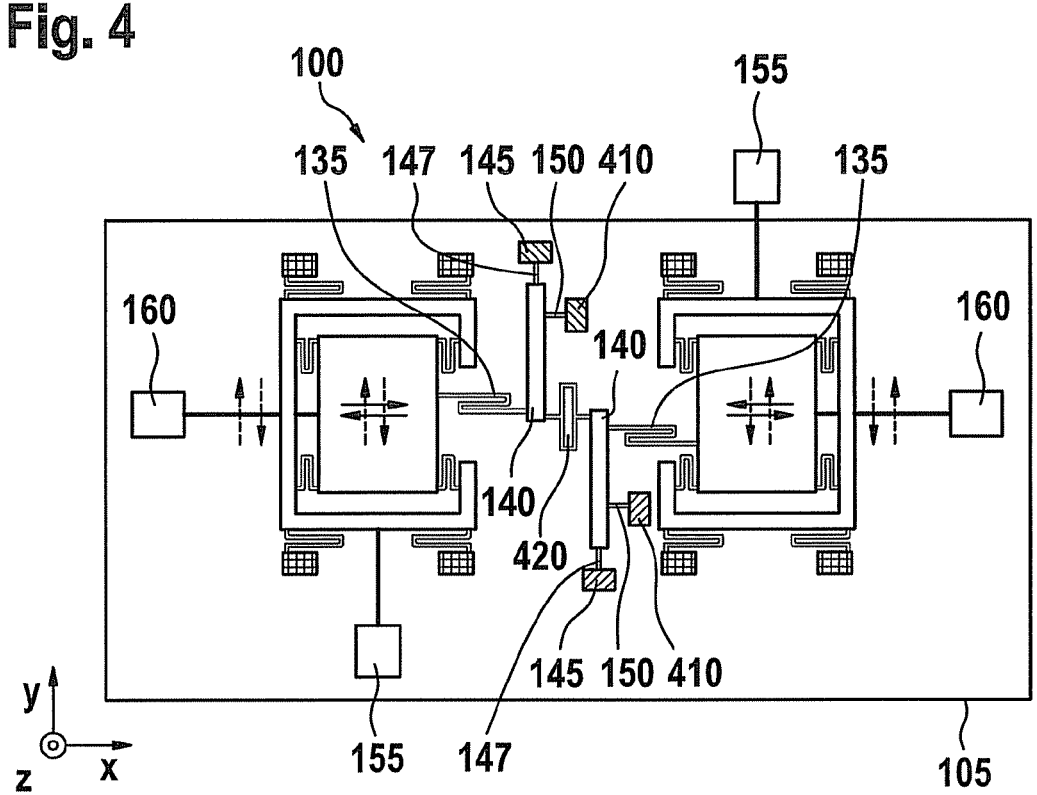
FIG. 4 shows the yaw-rate sensor according to FIG. 1 for electrical signal mixing.

In a fourth variant, which is shown in FIG. 4, the current paths leading through piezoresistive element 150 are selected in such a way that they do not run through any element of yaw-rate sensor 100 which is electrically connected to a drive voltage of drive unit 115. FIG. 4 shows yaw-rate sensor 100 from FIG. 2, piezoresistive elements 150 each being situated between one of levers 140 and one suspension point 410, suspension points 410 being fastened in an electrically isolated manner on semiconductor substrate 105. A compensation spring 420, which is movable in the x direction and is rigid in the y direction, is situated between levers 140. In addition, each lever 140 is connected using one of analysis springs 135 to one of mass elements 115. Bending webs 147 are situated parallel to levers 140.

Figure 5:
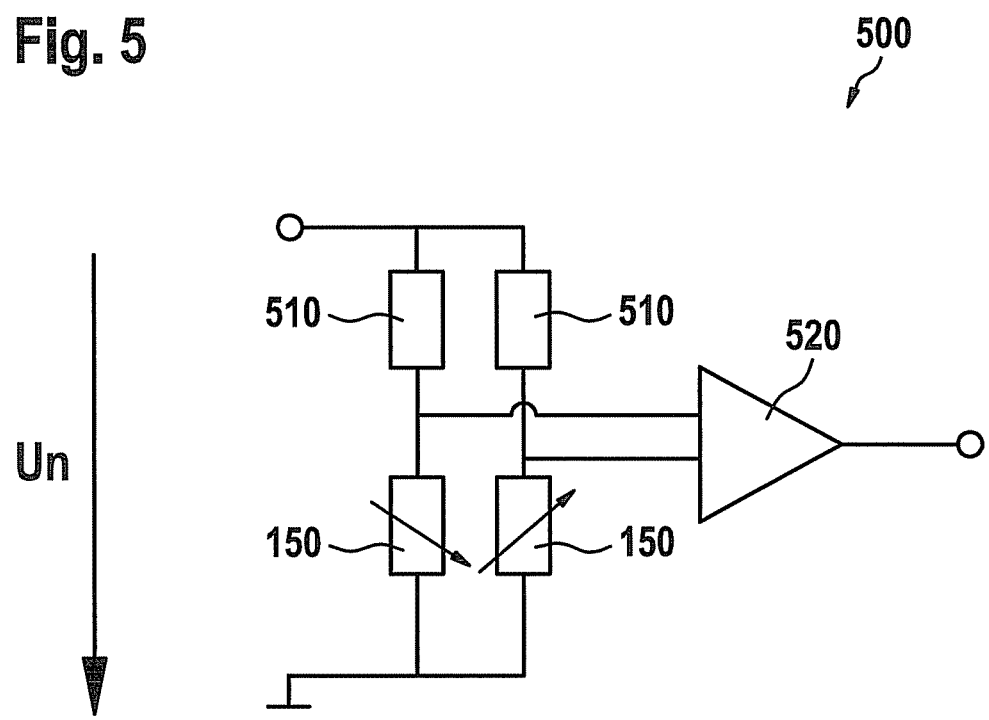
FIG. 5 shows an electrical signal mixer for the yaw-rate sensor from FIG. 4.

If a mechanical subtraction of the movements of mass bodies 115 is not performed in the x direction in the view shown in FIG. 4, electrical signal processing corresponding to FIG. 5 is necessary. FIG. 5 shows an electrical signal mixer 500 for the yaw-rate sensor from FIG. 4. Signal mixer 500 includes a so-called Wheatstone bridge, which is constructed from both piezoresistive elements 150 from FIG. 4 and two measuring resistors 510, and a subtractor 520. One measuring resistor 510 and one piezoresistive element 150 are connected in series in each case to a constant measuring voltage $U_M$. Subtractor 520 electrically calculates a difference between the voltages which result in each case between one of measuring resistors 510 and piezoresistive element 150 associated therewith. By varying one of measuring resistors 150, the signal mixer may be tuned to compensate for imperfections of the mechanical construction of yaw-rate sensor 100.

What is claimed is:

1. A yaw-rate sensor for determining a Coriolis force, comprising:
   a semiconductor substrate;
   a mass body mounted so it is movable over the semiconductor substrate, wherein the mass body includes two mass elements set to move in different directions;
   a drive unit for setting the mass body into an oscillating movement in a plane of the mass body; and
   a detection unit for determining deflections of the mass elements within the plane and caused by the Coriolis force, the detection unit including a piezoresistive element, wherein a piezoresistive element is operationally linked to the semiconductor substrate and a lever element, which is mounted in an anchor point so it is rotatable on the semiconductor substrate, is provided, and which is coupled to the mass body and the piezoresistive element so that a force or movement introduced by the mass body into the lever element is transmitted by the lever element using a conversion factor to the piezoresistive element.

2. The yaw-rate sensor according to claim 1, wherein the drive unit sets the mass body into movement electrostatically, magnetically, mechanically, optically, chemically, piezoelectrically, and/or thermally.

3. The yaw-rate sensor according to claim 1, wherein the drive unit and the detection unit are configured in such a way that a drive voltage of the drive unit is separated with respect to time and/or by differing frequency modulation from a measuring current of the detection unit.

4. A yaw-rate sensor for determining a Coriolis force, comprising:
   a semiconductor substrate;
   a mass body mounted so it is movable over the semiconductor substrate;
   a drive unit for setting the mass body into an oscillating movement; and
   a detection unit for determining a deflection of the mass body caused by the Coriolis force, the detection unit including a piezoresistive element, wherein the mass body includes two mass elements, which are set into movements in opposite directions by the drive unit, and a piezoresistive element is situated between the mass elements and is operationally linked to the mass elements in such a way that deflections of the mass elements caused by the Coriolis force act in opposite directions on the piezoresistive element.

5. The yaw-rate sensor according to claim 4, wherein a lever element is associated with each mass element, and the piezoresistive element is situated between the lever elements.

6. The yaw-rate sensor according to claim 5, wherein at least one lever element has an isolating element for electrical isolation, so that a part of the lever element and the piezoelectric element are electrically isolated from the semiconductor substrate.

7. The yaw-rate sensor according to claim 4, wherein a lever element is associated with each mass element, the lever elements are coupled to one another using a compensating spring, and the piezoresistive element is situated between one of the lever elements and a suspension point on the semiconductor substrate.

8. The yaw-rate sensor according to claim 7, wherein a second piezoresistive element, which is situated between a second lever element and a second suspension point, is provided and an electrical subtraction unit is provided, in order to compare signals provided by the piezoresistive elements.

* * * * *